United States Patent [19]

Mutschler et al.

[11] 4,346,274

[45] Aug. 24, 1982

[54] FASTENING DEVICE FOR A SWITCH

[75] Inventors: Erich Mutschler; Adam Weber, both of Bietigheim-Bissingen, Fed. Rep. of Germany

[73] Assignee: ITT Industries, Inc., New York, N.Y.

[21] Appl. No.: 157,223

[22] Filed: Jun. 9, 1980

[30] Foreign Application Priority Data

Aug. 21, 1979 [DE] Fed. Rep. of Germany ....... 2933703

[51] Int. Cl.³ .............................................. H01H 9/00
[52] U.S. Cl. .................................. 200/296; 200/295; 248/27.1
[58] Field of Search ........................... 248/27.1, 27.3; 200/295, 296; 339/125 R, 126 R, 128

[56] References Cited

U.S. PATENT DOCUMENTS

| 2,531,350 | 11/1950 | Chrastina | 200/296 |
| 3,337,836 | 8/1967 | Churla | 339/128 |
| 3,645,353 | 2/1972 | Cope | 248/27.1 |
| 3,960,349 | 6/1976 | Schierholz | 248/27.1 |
| 4,072,840 | 2/1978 | Daigle | 200/296 |
| 4,105,883 | 8/1978 | Hastings et al. | 200/296 |

FOREIGN PATENT DOCUMENTS 1351538 12/1963 France ............................ 200/296

Primary Examiner—John W. Shepperd
Attorney, Agent, or Firm—James B. Raden; William J. Michals

[57] ABSTRACT

An assembly for switches of the type which are pushed into a receptacle by means of webs guided in grooves. On each guide groove one side wall is staggered backwards relative to the other side wall in the longitudinal direction. It is then possible to bring webs and grooves into contact by a vertical movement with respect to the direction of insertion.

5 Claims, 12 Drawing Figures

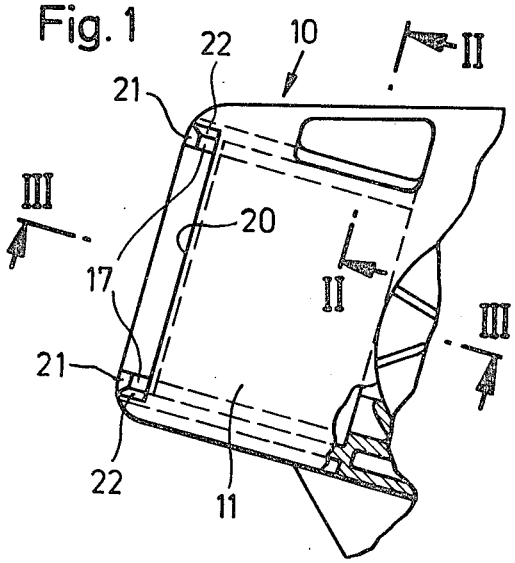
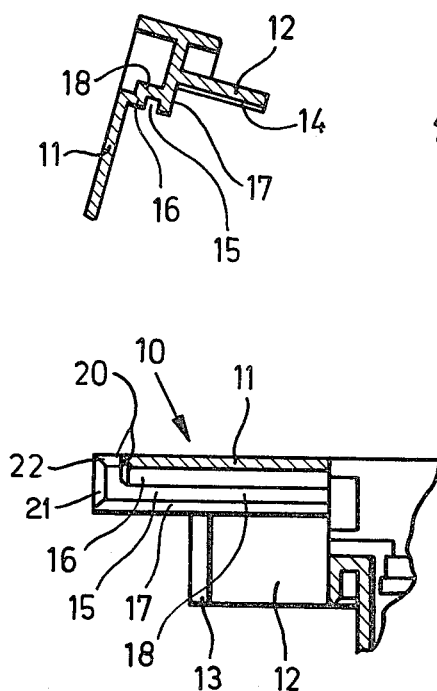
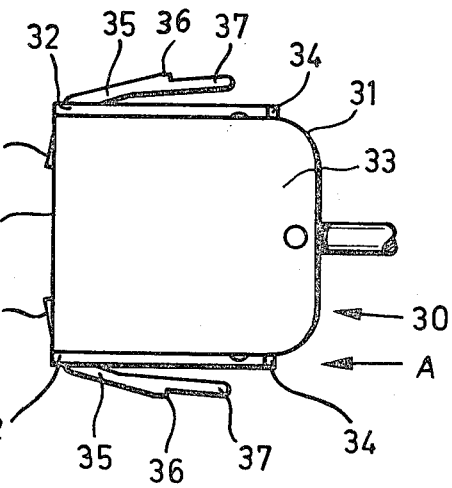
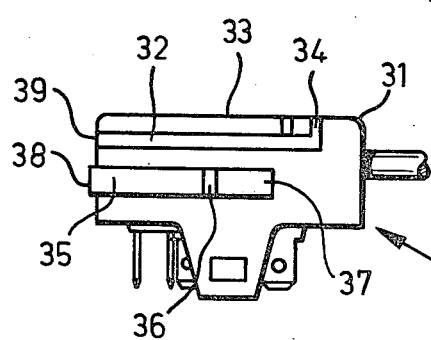

FASTENING DEVICE FOR A SWITCH

BACKGROUND OF THE INVENTION

The invention refers to a fastening device comprising the features of the preamble of claim 1.

Such a device comprising a switch and a receptacle is known from the DE-OS 27 19 194. Thereby the receptacle of the fastening device has two guide grooves which are arranged opposite to each other in two lateral walls. During the assembly two corresponding guide webs on the switch are inserted into the grooves and secure the switch in upward and downward direction. Into the other directions the position of the switch on the receptacle is secured by spring elements which are partly provided with detents with which they engage behind appropriate shoulders.

It is an object of the present invention to develop the fastening device with the features of the preamble of claim 1 in such a way that the mounting of the switch on the receptacle is facilitated.

This problem is solved by a fastening device having the features of the characterising part of the main claim.

SUMMARY OF THE INVENTION

According to the invention on each guide groove one side wall is staggered backwards relative to the other in longitudinal direction of the groove in such a way that the projecting portions of the longer side walls and the guide webs may be brought into contact by a vertical movement to the direction of insertion. When the fastening device is designed in such a way it is no longer necessary that at the beginning of the assembly the webs and the grooves have to be positioned exactly in a line, when they are brought to engage with each other. Now it is indeed possible to put the webs vertically on the respective longer side wall of the grooves and only then push them into the grooves. Thus not only the tedious and time-consuming putting-on at the beginning of the assembly is avoided to a far extent, but also the likelihood of a faulty assembly is diminished.

Advantageous embodiments of the invention can be seen from the subclaims. Thus by further developments of the invention it is achieved that the guide webs and the guide grooves can in a particularly simple manner be brought into such a position to each other, from which they can be slid into each other. In another embodiment this is enabled by a straight relative movement between switch and receptacle. Thereby according to the invention the switch can also be easily brought into the proper position also in the second transverse direction to the longitudinal direction of the webs and grooves due to the design of the bottom of the groove in the area of the projecting portion of the longer side wall. This is especially simple, when the front faces of the bottom of the groove and of the side walls and/or of the guide webs are bevelled as guide surfaces which become effective during the movement by which the webs and the longer side walls are brought into contact.

In spite of the design of the fastening device according to the invention it can indeed sometimes happen that the switch is put on the receptacle in the wrong manner. According to another embodiment it is provided in this case that the insertion path of the switch on the receptacle is limited. This is above all advantageous, if the switch is hold on the receptacle by means of resilient locking elements. Because of an appropriate design of the stops according to another embodiment the switch can easily be removed after a faulty mounting in order to be mounted properly thereafter. Thereby a faulty mounting can easily be recognised visually too, because the switch cannot be completely slid into the receptacle.

Still other embodiments provide favourably arranged stops limiting the insertion path of the switch on the receptacle.

BRIEF DESCRIPTION OF THE DRAWINGS

The invention is described in detail by way of embodiments shown in the accompanying drawings, in which FIG. 1 is a top view on a receptacle according to the invention;

FIG. 2 is a section taken on the line II—II of FIG. 1 trnsversally to a guide groove, FIG. 3 is a section taken on the line III—III of FIG. 1 including the view of a guide groove, FIG. 4 is a switch with holding elements, stops and guide webs which may be slid into the grooves of a receptacle, FIG. 5 is a lateral view of the switch according to FIG. 4.

DETAILED DESCRIPTION

Figure 6:
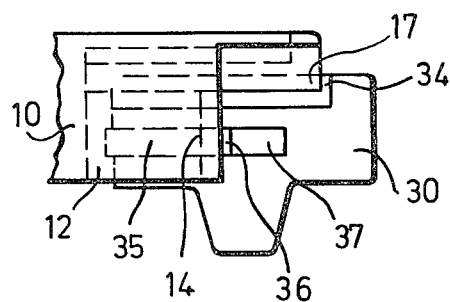
FIG. 6 is a receptacle and a switch according to the invention which is mounted on the receptacle in a wrong manner.

The receptacle 10 of FIGS. 1 to 3 substantially consists of a cover 11, from which laterally two parts 12 are extending downwards. The lateral parts 12 are substantially shorter that the cover 11 as it can be seen especially clearly from FIG. 3. Their front ends 13 are thicker, so that a stage 14 is provided.

On each side of the receptacle 10 there is a guide groove 15 which is staggered to the interior relative to the side parts 12 and which is formed by the two side walls 16 and 17 and the bottom 18 of the groove. The FIGS. 1 and 3 show that the lower side walls 17 are longer than the upper side walls 16 and the cover 11. The bottom 18 of the groove is as long as the side wall 17, in front of the shorter side wall 16 is widened beyond the width of the groove 15 and is flush with the cover 11. The front face 20 of the cover 11, the front faces 21, 22 of the side walls 16 and 17 as well as the front faces of the bottom 18 of the groove are bevelled to form guide surfaces.

The FIGS. 4 and 5 show a switch 30 which can be slid into a receptacle 10 according to the FIGS. 1 to 3. For this purpose each side wall of the switch housing 31 is provided with a guide web 32 the cross-section of which corresponds to the cross-section of the assigned guide groove of the receptacle. There is a certain space between the webs 32 and the top surface 33 of the switch housing 31. At the rear end in direction of mounting which is designated by arrow A the webs are extending upwards as stops 34 as far as to the top surface 33.

Below the webs 31 there is one holding spring 35 each with a detent 36. Behind the detent 36 the holding springs 35 are elongated to release keys 37. Two further spring elements 38 are located on the front side 39 of the switch housing 31. These spring elements are vertically resilient to the holding springs 35. One holding spring 35 and one spring element 38 each are connected with the switch housing 31 via a common web not to be seen in the drawing.

The fastening device according to the invention is permitting to put the guide webs 32 of the switch 30 on the lower and longer side walls 17 of the guide grooves 15 of the receptacle 10 and then to slid the switch 30 into said receptacle. If in spite of this the switch were once put on in a faulty manner a stop 34 hits the lower side wall 17 as it is shown in FIG. 6. Therefore the switch 30 cannot be pushed into the receptacle completely, so that the holding springs 35 with their detents 36 cannot engage behind the stage 14 of the lateral parts 12. Thus the switch can be removed easily.

Figure 7:
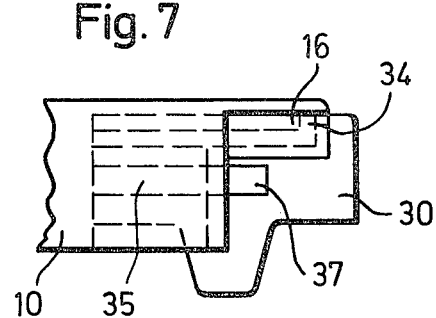
FIG. 7 is the properly mounted switch and receptacle of FIG. 6 and FIGS. 8 to 12: further embodiments of a fastening device according to the invention.
Figure 8:
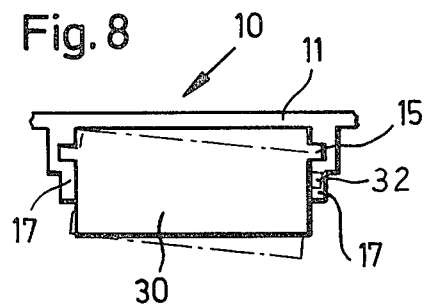

When the switch 30 is properly mounted as shown by FIG. 7 the stop 34 is located in the elongation of the shorter side wall 16. The switch could be slid into the receptacle without any difficulties, so that the holding springs 35 are locked. If now the switch has to be removed again from the receptacle 10 because of any reason the release keys 37 have to be pressed. As soon as the detents 36 are unlocked the switch 10 is a little bit pushed out of the receptacle 10 by the spring elements 38, so that the detents 36 no longer engage behind the stages 14 and then the switch can be removed easily at last.

Further embodiments of a fastening device according to the invention with differently arranged guide grooves and guide webs and stops limiting the insertion path of the switch are shown in FIGS. 8 to 12. In the example according to FIG. 8 the lower side wall 17 of the guide grooves 15 is elongated in downward direction. As it is indicated in the drawing one of the guide webs 32 on the switch 30 hits this elongation, if the switch is put on diagonally. Thus it cannot be pushed in completely. Above all the lower side wall 17 can be easily elongated, when the guide grooves are directly below the cover 11 of the receptacle, so that the switch housing with the guide webs will have the shape of a T.

Figure 9:
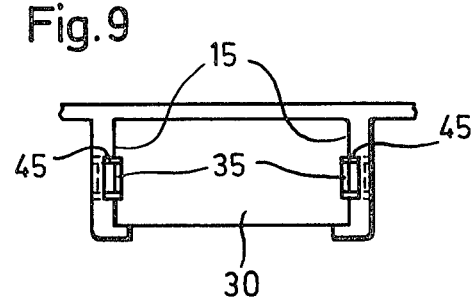

An embodiment in which the width of the guide grooves 15 corresponds to the height of the switch 30 and the holding springs 35 are received in hollows 45 in the bottom of the groove can be seen in FIG. 9.

Figure 10:
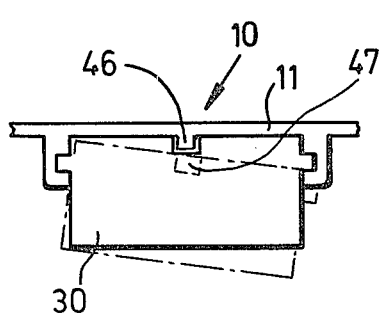

FIG. 10 shows a fastening device in which the receptacle 10 on its cover 11 has a web 46 directed to the bottom which, when the switch is properly mounted, extends in a groove 47 of the switch 30. Of course the arrangement can also be reversed and include a web on the switch and a groove on the receptacle. If the switch is diagonally put on the receptacle 10 the web 46 hits one side wall of the groove 47, so that the switch 30 cannot be pushed in completely.

Figure 11:
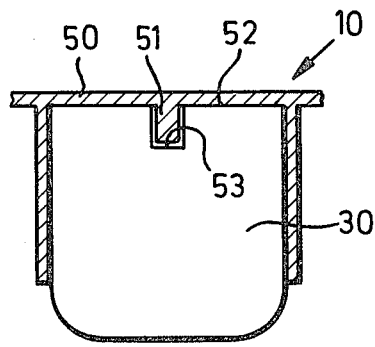

According to FIG. 11 on the back wall 50 of the receptacle 10 there is a pin 51 and on the front side 52 of the switch 30 there is a recess 53, into which the pin engages with proper assembly. If, however, the assembly is faulty the pin 51 hits the front side 52 of the switch 52 and thereby limits the insertion of the switch. The same effect is achieved by a pin on the front side of the switch and a recess on the back wall of the receptacle.

Figure 12:
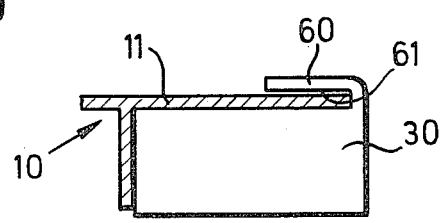

FIG. 12 finally shows an embodiment, in which the cover 11 of the receptacle 10 is overlapped by a lug 60 formed on the switch 30. The cover 11 is partially located in the recess 61 formed by the switch 30 and the lug 60. If the switch is put on the receptacle diagonally the front side of the lug 60 hits the front side of the cover 11.

When, due to a faulty assembly, the insertion movement of the switch on the receptacle is limited by stops, this does not only entail the advantage that the holding springs cannot engage, but the faulty assembly can also easily be recognised visually. Thus such a design of the fastening device according to the invention effectively supplements the development of the guide grooves and guide webs according to the invention. But it can be used with advantage even alone.

What is claimed is:

1. A fastening device for a switch in a receptacle with at least two guide grooves, of which each has a bottom and two opposite lateral walls and comprises at least two guide webs which for mounting the switch on the receptacle are pushed into the guide grooves, wherein in longitudinal direction of the groove on each guide groove the one side wall is staggered backwards relative to the other side wall in such a way that the projecting portion of the longer side walls and the guide webs may be brought into contact by a vertical movement with respect to the direction of insertion.

2. The fastening device according to claim 1, wherein on each guide groove the corresponding side wall is staggered backwards.

3. The fastening device according to claim 2, wherein the bottom of the groove is as long as the longer lateral wall of each groove.

4. The fastening device according to claim 3, wherein the bottom of the groove in front of the shorter side wall is widened beyond the width of the groove.

5. The fastening device according to claim 4, wherein the front faces of the bottom of the groove and of the side walls and/or of the guide webs are bevelled to form guide surfaces.

* * * * *